US010273979B2

(12) United States Patent
Arikawa et al.

(10) Patent No.: US 10,273,979 B2
(45) Date of Patent: Apr. 30, 2019

(54) ACCUMULATOR

(71) Applicant: EAGLE INDUSTRY CO., LTD., Tokyo (JP)

(72) Inventors: Tatsuhiro Arikawa, Tokyo (JP); Matsuyoshi Yamashita, Tokyo (JP); Koji Sato, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/563,432

(22) PCT Filed: Mar. 28, 2016

(86) PCT No.: PCT/JP2016/059849
§ 371 (c)(1),
(2) Date: Sep. 29, 2017

(87) PCT Pub. No.: WO2016/158833
PCT Pub. Date: Oct. 6, 2016

(65) Prior Publication Data
US 2018/0066679 A1    Mar. 8, 2018

(30) Foreign Application Priority Data

Apr. 2, 2015 (JP) ................................. 2015-076279

(51) Int. Cl.
*F16L 55/04*   (2006.01)
*F15B 1/14*    (2006.01)
(Continued)

(52) U.S. Cl.
CPC ................ *F15B 1/14* (2013.01); *F15B 1/103* (2013.01); *F16F 9/096* (2013.01);
(Continued)

(58) Field of Classification Search
CPC ...... F16L 9/096; F15B 1/103; F15B 2201/205; F15B 2201/3153; F15B 2201/3158; F15B 2201/353
(Continued)

(56) References Cited

U.S. PATENT DOCUMENTS 2,731,037 A    1/1956  Schindler et al.
6,478,051 B1 * 11/2002  Drumm .................... F15B 1/033
                                                     138/30
6,622,755 B2 *  9/2003  Weber ...................... F15B 1/103
                                                     138/30

FOREIGN PATENT DOCUMENTS

JP     02113139 A  *  4/1990  .............. F15B 1/103
JP     H02-113139 A    4/1990
(Continued)

OTHER PUBLICATIONS

Extended European Search Report dated Oct. 9, 2018 (corresponding to EP16772714.8).

*Primary Examiner* — Patrick F Brinson
(74) *Attorney, Agent, or Firm* — Harness, Dickey & Pierce, P.L.C.

(57) ABSTRACT

An accumulator is provided, which is aimed at stabilization in mounting state of a damping member while diminishing the impact on a metal bellows. In an accumulator (100), a damping member (190) formed slidably at the inner circumferential surface of a pressure vessel (110) and suppressing the oscillation of a metal bellows (130) while keeping a gap between the metal bellows (130) and the inner circumferential surface of the pressure vessel (110) is mounted at at least one site of a plurality of annular valley parts of the metal bellows(130) including a plurality of annular crest parts and the plurality of annular valley parts alternately formed therein. In the damping member (190), a radially inward tip is fitted with the valley part, and a radially
(Continued)

outward tip is longer than the crest part of the metal bellows radially and outwardly.

3 Claims, 9 Drawing Sheets

(51) Int. Cl.
*F15B 1/10* (2006.01)
*F16F 9/096* (2006.01)

(52) U.S. Cl.
CPC . *F15B 2201/205* (2013.01); *F15B 2201/3153* (2013.01); *F15B 2201/3158* (2013.01)

(58) Field of Classification Search
USPC .............................................. 138/26, 30, 31
See application file for complete search history.

(56) References Cited

FOREIGN PATENT DOCUMENTS

| | | |
|---|---|---|
| JP | H11-117901 A | 4/1999 |
| JP | 2001-012401 A | 1/2001 |
| JP | 2006-300090 A | 11/2006 |
| JP | 2012-167748 A | 9/2012 |

\* cited by examiner

ACCUMULATOR

CROSS-REFERENCE TO RELATED APPLICATIONS

This application is a National Stage of International Application No. PCT/JP2016/059849, filed Mar. 28, 2016 (now WO 2016/158833A1), which claims priority to Japanese Application No. 2015-076279, filed Apr. 2, 2015. The entire disclosures of each of the above applications are incorporated herein by reference.

FIELD

The present disclosure relates to an accumulator for use in releasing a large amount of energy in a short time, diminishing pressure fluctuations, and the like.

BACKGROUND

Conventionally, an accumulator including a metal bellows has been used in order to perform release of a large amount of energy for a short time, diminishment of pressure fluctuations, and the like. In such an accumulator, in order to suppress the metal bellows from colliding with a pressure vessel when the metal bellows is oscillated due to external oscillation, a slide ring also having a bearing function is provided at the tip of the metal bellows. However, only the slide ring may be insufficient under various conditions such as the length of the metal bellows. Under such circumstances, an intermediate ring (damping member) exhibiting the same function as that of the slide ring may also be provided at the intermediate position in the axial direction of the metal bellows. Such a technology will be described by reference to FIG. 11. FIG. 11 is a schematic cross sectional view of an accumulator in accordance with a conventional example.

An accumulator 500 in accordance with a conventional example has a pressure vessel (shell) 510, and a port forming member 520 provided so as to close the opening of the pressure vessel 510, and having a port. Then, the pressure vessel 510 is provided therein with a metal bellows 530 which is a constituent member of a partition unit for partitioning the space in the vessel into a gas chamber (G) including a gas sealed therein, and a fluid chamber (L) including a working fluid flowing therein. At the tip of the metal bellows 530, a slide ring 540 also having a bearing function is provided. The slide ring 540 is configured such that the outer circumferential surface thereof is slidable with respect to the inner circumferential surface of the pressure vessel 510. This allows the metal bellows 530 to be expanded and contracted smoothly, and suppresses the oscillation of the metal bellows 530. However, depending upon various conditions, the vicinity of the intermediate part of the metal bellows 530 may collide with the inner circumferential surface of the pressure vessel 510. Under such circumstances, in the conventional example, an intermediate ring (damping member) 590 is provided at the intermediate position in the axial direction of the metal bellows 530.

The intermediate ring 590 includes a thin sheet annular trunk part 591, and a guide part 592 having a wider width in the expansion and contraction direction (equal to the axial direction) of the metal bellows 530 than the width of the trunk part 591. A plurality of the guide parts 592 are provided spaced apart from one another in the circumferential direction on the radially outward side of the trunk part 591. The radially outward surface of the guide part 592 is formed slidably with respect to the inner circumferential surface of the pressure vessel 510. As a result, the function of guiding the movement of the trunk part 591 is exerted. The intermediate ring 590 formed as described up to this point exerts the same function as that of the slide ring 540. For this reason, even in the vicinity of the intermediate part of the metal bellows 530, the expansion and contraction of the metal bellows 530 become smooth, so that the oscillation of the metal bellows 530 is suppressed.

However, with the intermediate ring 590 in accordance with the conventional example, a gap is formed between the radially inward tip of the trunk part 591 and the valley part of the metal bellows 530. Further, the tips of the crest parts of the metal bellows 530 are configured so as to abut on the radially inward surface of the guide part 592. For this reason, when the intermediate ring 590 receives an impact from the inner circumferential surface of the pressure vessel 510 due to the oscillation of the metal bellows 530, the impact is transmitted via the guide part 592 of the intermediate ring 590 to the crest parts of the metal bellows 530 without much diminishment of the impact. Therefore, the crest parts of the metal bellows 530 may be deformed or broken.

Further, with the metal bellows 530 being contracted, the gap between the belly parts of the metal bellows 530 becomes narrower. For this reason, in order to prevent the expansion and contraction of the metal bellows 530 from being affected, it is necessary to reduce the thickness of the trunk part 591 of the intermediate ring 590 (equivalent to the width in the expansion and contraction direction (equal to the axial direction) of the metal bellows 530). As a result, with the metal bellows 530 being expanded, a large gap is caused between the belly parts of the metal bellows 530 and the trunk part 591 of the intermediate ring 590. For this reason, the mounting state of the intermediate ring 590 is unstable. Further, there is no stability during sliding.

CITATION LIST

Patent Literature

[PTL 1] Japanese Patent Application Publication No. 2006-300090
[PTL 2] Japanese Patent Application Publication No. H02-113139

SUMMARY

Technical Problem

An object of the present disclosure is to provide an accumulator implemented in stabilization of the mounting state of a damping member while diminishing the impact on a metal bellows.

Solution to Problem

The present disclosure adopted the following means in order to solve the problem.

Namely, an accumulator of the present disclosure includes: a pressure vessel; and a partition unit provided in the pressure vessel, and partitioning an internal space thereof into a gas chamber containing a gas sealed therein, and a fluid chamber containing a working fluid flowing therein, the partition unit including a metal bellows to be expanded and contracted according to the pressure in the gas chamber and the pressure in the fluid chamber, the metal bellows including a plurality of annular crest parts and a plurality of annular valley parts alternately formed therein, a damping member formed slidably at an inner circumferential surface of the pressure vessel and suppressing the oscillation of the metal bellows while keeping a gap between the metal bellows and the inner circumferential surface of the pressure vessel, the damping member being mounted at at least one site of the plurality of annular valley parts of the metal bellows, wherein in the damping member, a radially inward tip is fitted with the valley part, and a radially outward tip is longer than the crest part of the metal bellows radially and outwardly.

In accordance with the accumulator of the present disclosure, the damping member can suppress the metal bellows from directly abutting on the inner circumferential surface of the pressure vessel, and can suppress the oscillation of the metal bellows. Further, the damping member is configured such that the radially inward tip is fitted in the valley part of the metal bellows, and such that the radially outward tip is longer than the crest part of the metal bellows radially outwardly. For this reason, even when the damping member receives an impact from the inner circumferential surface of the pressure vessel, the impact can be suppressed from being transmitted to the crest parts of the metal bellows. Herein, when the damping member receives an impact from the inner circumferential surface of the pressure vessel, the impact is transmitted to the valley parts of the metal bellows. However, the impact is transmitted throughout the overall damping member. For this reason, as compared with the case where an impact is transmitted from the guide part 592 of the intermediate ring 590 to the crest parts as in the conventional example, the impact can be sufficiently diminished. Further, the damping member is configured such that the radially inward tip is fitted with respect to the valley part of the metal bellows, and hence can stabilize the mounting state on the metal bellows.

The damping member includes: a trunk part extending in the circumferential direction; and a fitted part provided on the radially inward side of the trunk part, and fitted with the valley part.

The damping member may be desirably positioned and fixed at the metal bellows so as to form a gap between the metal bellows and the trunk part, regardless of an expanded or contracted state of the metal bellows.

As a result, the expansion and contraction of the metal bellows are not suppressed by the damping member.

A plurality of guide parts may be provided spaced apart from each another in the circumferential direction on the radially outward side of the trunk part, a width of each guide part in the expansion and contraction direction of the metal bellows being wider than a width of the trunk part in the direction, and each guide part guiding movement of the trunk part.

As a result, the damping member allows the metal bellows to be expanded and contracted smoothly.

The thickness of the guide part may be desirably set at a thickness such that the guide part does not contact with the tip of the crest part of the metal bellows, regardless of the expanded or contracted state of the metal bellows.

This can suppress the transmission of an impact to the crest parts of the metal bellows when the damping member receives an impact from the inner circumferential surface of the pressure vessel even in the case where the guide part is provided.

Incidentally, the respective configurations can be adopted in combination as much as possible.

Advantageous Effects of the Disclosure

As described up to this point, in accordance with the present disclosure, the mounting state of the damping member can be stabilized while diminishing the impact on the metal bellows.

DRAWINGS

DETAILED DESCRIPTION

Below, by reference to the drawings, the aspects for carrying out this disclosure will be described exemplarily in details by way of examples. However, it is not construed that unless particularly specified, as for the dimensions, materials, shapes, relative positions and the like of constituent components described in the examples, the scope of this disclosure is limited thereto.

EXAMPLE 1

Figure 1:
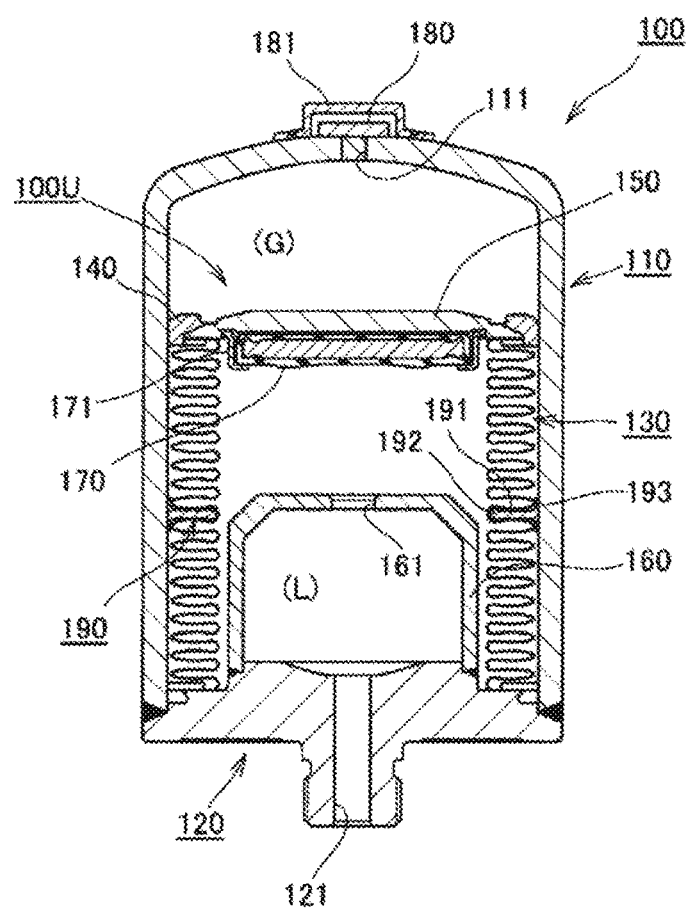
FIG. 1 is a schematic cross sectional view of an accumulator in accordance with Example 1 of the present disclosure.
Figure 2:
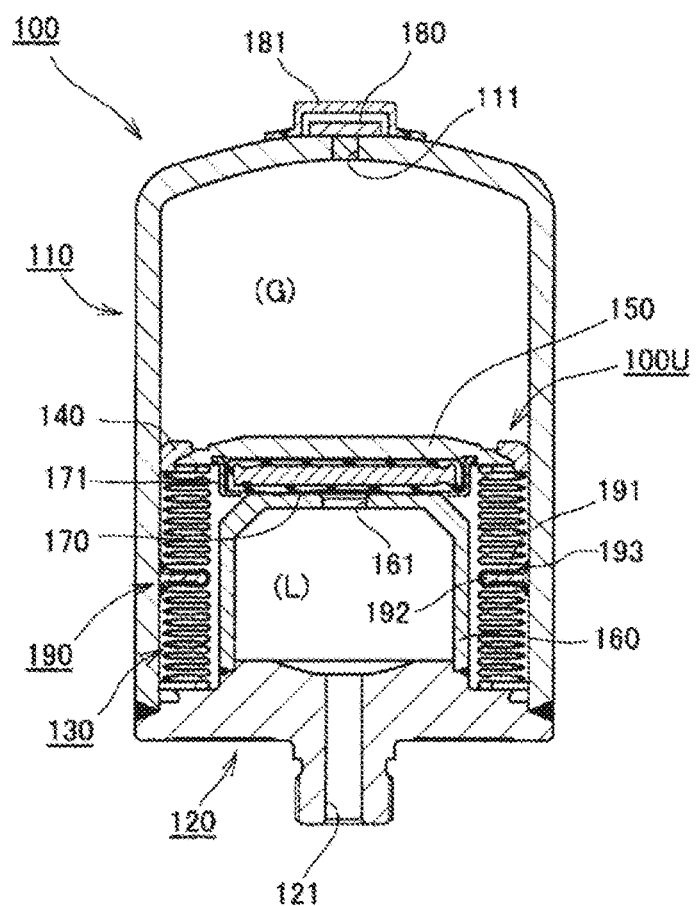
FIG. 2 is a schematic cross sectional view of the accumulator in accordance with Example 1 of the present disclosure.
Figure 3:
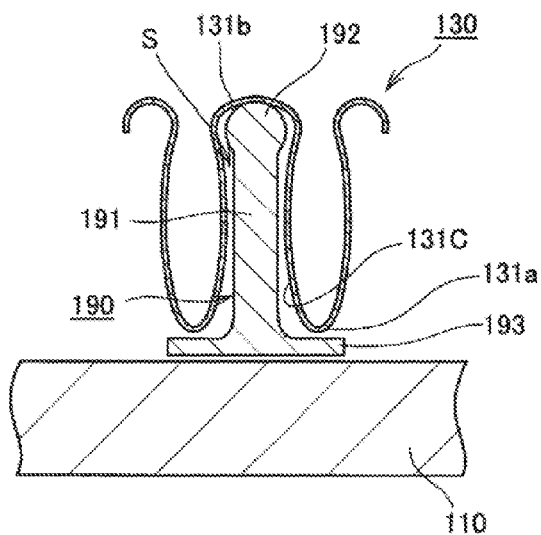
FIG. 3 is a partially enlarged view of the schematic cross sectional view of the accumulator in accordance with Example 1 of the present disclosure.
Figure 4:
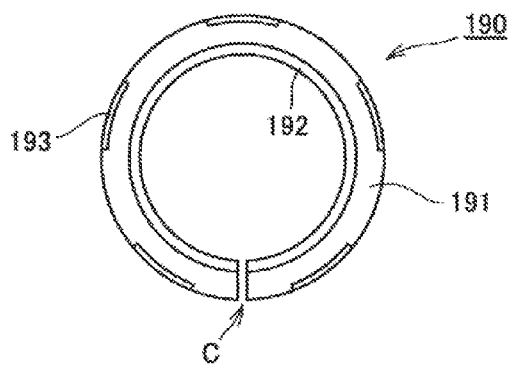
FIG. 4 is a plan view of a damping member in accordance with Example 1 of the present disclosure.
Figure 5:
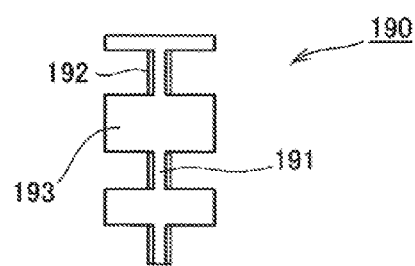
FIG. 5 is a side view of the damping member in accordance with Example 1 of the present disclosure.

Referring to FIGS. 1 to 5, an accumulator in accordance with Example 1 of the present disclosure will be described. FIGS. 1 and 2 are each a schematic cross sectional view of the accumulator in accordance with Example 1 of the present disclosure, where FIG. 1 shows a metal bellows being expanded, and FIG. 2 shows the metal bellows being contracted. FIG. 3 is a partially enlarged view of the schematic cross sectional view of the accumulator in accordance with Example 1 of the present disclosure, and is a cross sectional view showing the vicinity of the part where a damping member is mounted. FIG. 4 is a plan view of the damping member in accordance with Example 1 of the present disclosure. FIG. 5 is a side view of the damping member in accordance with Example 1 of the present disclosure, and is a view of the damping member as seen from the outer circumferential surface side.

<Whole Accumulator>

Particularly, referring to FIGS. 1 and 2, the whole configuration of the accumulator in accordance with Example 1 of the present disclosure will be described. An accumulator 100 in accordance with the present example can be used for performing release of a large amount of energy in a short time, diminishment of the pressure fluctuations, and the like. As more specific examples, the accumulator 100 can be used for diminishing the pulsation in the piping through which an oil flows in a car. Further, the accumulator 100 in accordance with the present example is rotationally symmetric with respect to the center axis.

The accumulator 100 in accordance with the present example has a pressure vessel (shell) 110 in a substantially bottomed cylindrical shape, and a port forming member 120 provided so as to close the opening of the pressure vessel 110, and having a port 121 serving as the gateway for a working fluid. The pressure vessel 110 is provided on the bottom side thereof with a through hole 111 for injecting a gas therethrough. After injection of a gas, a plug 180 is forced into the through hole 111. Incidentally, a plug guide 181 is fixed at the bottom surface of the pressure vessel 110 so as to prevent the plug 180 from being removed with ease after forcing of the plug 180 therein, and so as to allow an accumulator attaching tool to be mounted.

The pressure vessel 110 is provided therein with a partition unit 100U for partitioning the space in the vessel into a gas chamber (G) including a gas sealed therein, and a fluid chamber (L) including a working fluid flowing therein. The partition unit 100U has a metal bellows 130, and a bellows cap 150 fixed at the metal bellows 130. The metal bellows 130 is a bellows-shaped and substantially cylindrical member including a plurality of annular crest parts (vicinities of the radially outward tip of the bellows) and a plurality of annular valley parts (vicinities of the radially inward tip of the bellows) alternately formed therein. Further, one end side of the metal bellows 130 is fixed at the port forming member 120, and a bellows cap 150 is fixed on the other end side thereof. The partition unit 100U thus configured partitions the space in the pressure vessel 110 into the gas chamber (G) and the fluid chamber (L). Herein, a given quantity of gas is sealed in the gas chamber (G). Whereas, the fluid pressure in the fluid chamber (L) varies according to the flow of the working fluid. As a result, the metal bellows 130 is expanded or contracted so that a balance is kept between the atmospheric pressure in the gas chamber (G) and the fluid pressure in the fluid chamber (L).

Further, a seal member 170 is fixed at the bellows cap 150 by a seal holder 171. Whereas, the metal bellows 130 is provided on the inner side thereof with a substantially bottomed cylindrical member 160. The substantially bottomed cylindrical member 160 is fixed at the opening end side thereof to the port forming member 120. Whereas, the substantially bottomed cylindrical member 160 is provided on the bottom side thereof with a through hole 161. When the fluid pressure in the fluid chamber (L) becomes equal to, or less than a given value, the metal bellows 130 is contracted, so that the seal member 170 comes in close contact with the bottom surface of the substantially bottomed cylindrical member 160. As a result, the through hole 161 is closed (see FIG. 2). This results in that a part of the working fluid which has been flowing in the fluid chamber (L) is enclosed in the annular space formed by the outer circumferential surface of the substantially bottomed cylindrical member 160, the seal member 170, the inner circumferential surface of the metal bellows 130, and the like. Therefore, the fluid pressure in the annular space and the atmospheric pressure on the outer circumferential surface side of the metal bellows 130 are kept being substantially equal to each other. This suppresses the deformation of the metal bellows 130.

Further, the metal bellows 130 is provided at the tip thereof with a slide ring 140 also having a bearing function. The slide ring 140 is formed such that the outer circumferential surface thereof is slidable with respect to the inner circumferential surface of the pressure vessel 110. This allows the metal bellows 130 to be expanded and contracted smoothly, and suppresses the oscillation of the metal bellows 130. However, depending upon various conditions, the vicinity of the intermediate part of the metal bellows 130 may collide with the inner circumferential surface of the pressure vessel 110. Under such circumstances, in the present example, a damping member 190 made of a resin is provided at the intermediate position in the axial direction of the metal bellows 130 (in the present example, the center in the axial direction of the metal bellows 130). Incidentally, preferable examples of the specific material for the damping member 190 may include polyamide, polytetrafluoroethylene, phenol resin (bakelite), and polyester type plastic. Whereas, as the materials for the damping member 190, brass, rubber, metal (such as brass or aluminum) coated at the surface with a sliding material can also be used not limited to a resin. Alternatively, the damping member 190 can also be formed of a resin, rubber, brass, and the like (e.g., the most part is formed of rubber and brass, and a resin material is used for the sliding part).

<Damping Member>

Particularly, referring to FIGS. 3 to 5, the damping member 190 will be described in details. The damping member 190 is formed slidably with respect to the inner circumferential surface of the pressure vessel 110. Further, the damping member 190 has a role of suppressing the oscillation of the metal bellows 130 while keeping the gap between the metal bellows 130 and the inner circumferential surface of the pressure vessel 110. The damping member 190 in accordance with the present example is formed such that the radially inward tip thereof is fitted with respect to the valley part 131b of the metal bellows 130. More specifically, the damping member 190 in accordance with the present example has a trunk part 191 extending in the circumferential direction, and a fitted part 192 provided on the radially inward side of the trunk part 191, and fitted with respect to the valley part 131b of the metal bellows 130. Further, the damping member 190 in accordance with the present example is provided on the radially outward side of the trunk part 191 with a guide part 193 having a wider width in the expansion and contraction direction (equal to the axial direction) of the metal bellows 130 than the width of the trunk part 191. The guide part 193 has a role of guiding the movement of the trunk part 191. A plurality of the guide parts 193 are provided spaced apart from one another in the circumferential direction on the radially outward side of the trunk part 191. Incidentally, in the present example, the guide parts 193 are provided at five positions. The number of the guide parts 193 may be appropriately set. Further, the outer circumferential surfaces of the guide part 193, and the portions of the trunk part 191 at which the guide part 193 is not provided are designed so that a slight gap is formed between the outer circumferential surfaces thereof and the inner circumferential surface of the pressure vessel 110 (see FIG. 3). Incidentally, not limited to this configuration, the trunk part 191 or the guide part 193 may be provided with a through hole for circulating the fluid inside the pressure vessel 110 therethrough. Further, in the outer circumferential surfaces of the trunk part 191 and the guide part 193, a groove for circulating the fluid inside the pressure vessel 110 therethrough may be provided.

The trunk part 191 is formed of a thin sheet annular portion. Further, in order to facilitate mounting of the damping member 190 to the metal bellows 130, a cut part C is provided at one site in the circumferential direction of the trunk part 191. However, if there is no problem about the mountability, the cut part C is not required to be provided. Alternatively, after mounting the damping member 190 at the metal bellows 130, the ends on the opposite sides of the cut part C may be joined with each other. Incidentally, in the present example, the trunk part 191 is formed in a nearly annular shape, but may also be formed in a circular arc shape. However, when the angle of the circular arc is less than 180°, in order to prevent the metal bellows 130 from colliding with the inner circumferential surface of the pressure vessel 110, a plurality of the damping members 190 are required to be mounted so that the mounting positions in the circumferential direction are different from one another. Alternatively, when only one damping member 190 is used, the angle of the circular arc is required to exceed 180°. Incidentally, when a circular arc-shaped trunk part 191 is adopted, there is an advantage that the damping member 190 tends to be mounted at the metal bellows 130.

Then, for the damping member 190, the fitted part 192 at the radially inward tip is fitted with respect to the valley part 131b of the metal bellows 130, so that the damping member 190 is positioned and fixed while being apart from the tip of the crest part 131a in the metal bellows 130. Incidentally, the inner diameter of the fitted part 192 is set smaller than the outer diameter of the valley part 131b. As a result, the tip of the fitted part 192 is pressed against the valley part 131b. This causes the damping member 190 to be fixed while being positioned with respect to the metal bellows 130. Further, in the present example, the radial length of the trunk part 191 of the damping member 190 is formed so as to be longer than the radial distance (distance when maximized) from the tip of the crest part 131a to the bottom of the valley part 131b of the metal bellows 130. This forms a gap between the tip of the crest part 131a of the metal bellows 130 and the guide part 193 of the damping member 190. Therefore, the damping member 190 is kept being apart from the tip of the crest part 131a of the metal bellows 130. Only a slight gap may be set to an inevitable degree in terms of mounting between the inner diameter of the fitted part 192 and the outer diameter of the valley part 131b. Further, in the damping member 190, as described above, the radially inward tip thereof is fitted with respect to the valley part 131b of the metal bellows 130. In this state, the radially outward tip of the damping member 190 is longer radially outwardly than the crest part 131a of the metal bellows 130. Then, the thickness of the guide part 193 is set at a thickness such that the guide part 193 does not contact with the tip of the crest part 131a of the metal bellows 130, regardless of the expanded or contracted state of the metal bellows 130. With the configuration described up to this point, the damping member 190 is kept apart from the tip of the crest part 131a of the metal bellows 130.

Further, with the damping member 190 positioned and fixed at the metal bellows 130, a gap S is formed between the metal bellows 130 and the trunk part 191 regardless of the expanded or contracted state of the metal bellows 130. In other words, as shown in FIG. 3, the gap S is formed between the belly part 131c between the crest part 131a and the valley part 131b of the metal bellows 130 and the trunk part 191 regardless of the expanded or contracted state of the metal bellows 130.

Incidentally, in the present example, at the site in the metal bellows 130 at which the damping member 190 is mounted, the interval between the adjacent belly parts 131c of the metal bellows 130 is formed wider than at other sites. As a result, the thickness of the trunk part 191 of the damping member 190 (equivalent to the width in the expansion and contraction direction (equal to the axial direction) of the metal bellows 130) can be set so as to provide a necessary strength. However, when the thickness of the trunk part 191 is set so as to provide the necessary strength of the trunk part 191, and the interval between the adjacent belly parts 131c of the metal bellows 130 is the minimum dimension, unless the trunk part 191 is in contact with the metal bellows 130, at the site of the metal bellows 130 at which the damping member 190 is mounted, the shape and the dimension are not required to be changed from those at other sites.

Further, in the metal bellows 130 in accordance with the present example, a formed bellows obtained in the following manner is adopted. Using a cylindrical member made of a metal as a material, the material is arranged in a bellows-shaped die; in this state, a fluid pressure is applied thereto from inside; as a result, the material is formed into a shape along the inner wall surface of the die.

<Excellent Points of Accumulator in Accordance with the Present Example>

With the accumulator 100 in accordance with the present example, the damping member 190 can suppress the metal bellows 130 from directly abutting on the inner circumferential surface of the pressure vessel 110, and can suppress the oscillation of the metal bellows 130. Further, in the damping member 190, the radially inward tip (fitted part 192) is fitted with respect to the valley part 131b of the metal bellows 130. As a result, the damping member 190 is positioned and fixed apart from the tip of the crest part 131a of the metal bellows 130. For this reason, even when the damping member 190 receives an impact from the inner circumferential surface of the pressure vessel 110, the impact can be suppressed from being transmitted to the crest part 131a of the metal bellows 130. Herein, when the damping member 190 receives an impact from the inner circumferential surface of the pressure vessel 110, the impact is transmitted throughout the whole damping member 190 although the impact is transmitted to the valley part 131b of the metal bellows 130. In other words, the impact from the inner circumferential surface of the pressure vessel 110 is transmitted from the guide part 193 through the trunk part 191 and the fitted part 192 to the valley part 131b of the metal bellows 130. As a result, the impact is diminished by the whole damping member 190. Therefore, the impact can be sufficiently diminished as compared with the case where an impact is transmitted from the guide part 592 of the intermediate ring 590 to the crest part as in the conventional example. As described up to this point, the damping member 190 diminishes the impact on the metal bellows 130, and hence can suppress the metal bellows 130 from being deformed or broken.

Further, in the damping member 190, the radially inward tip (fitted part 192) thereof is fitted with respect to the valley part 131b of the metal bellows 130. For this reason, the mounted state at the metal bellows 130 can be stabilized. Alternatively, the radially inward tip (fitted part 192) of the damping member 190 may be formed in an R shape (curved surface shape) so as to follow the R shape (curved surface shape) of the valley part 131b. This results in a larger area of the contact part between the fitted part 192 and the valley part 131b, which can reduce the contact pressure. Herein, in the present example, as described above, as the metal bellows 130, a formed bellows is adopted. In the case of the formed bellows, as described above, using a cylindrical member made of a metal as a material, while being arranged in a bellows-shaped die, the material is applied with a fluid pressure from the inside, thereby to be formed in a bellows shape. For this reason, in the case of the formed bellows, generally, the dimension precision of the valley part is high. However, for the crest part formed by swelling due to the fluid pressure, the dimension precision is lower than that of the valley part. In the present example, the following configuration is adopted: the fitted part 192 is fitted with the valley part 131*b* having a high dimension precision, thereby to position and fix the damping member 190 at the metal bellows 130. Therefore, the positioning precision of the damping member 190 can be enhanced. Incidentally, when such a configuration that the damping member is caused to abut on the crest part of the metal bellows is adopted, the positioning precision of the damping member is reduced. In some cases, the dimensions of the damping member may be required to be adjusted individually according to the dimensions of the crest part.

Further, in the present example, the damping member 190 is positioned and fixed at the metal bellows 130 so that the gap S is formed between the metal bellows 130 and the trunk part 191 regardless of the expanded or contacted state of the metal bellows 130. This also will not cause the damping member 190 to suppress expanding or contracting of the metal bellows 130.

Further, in the damping member 190 in accordance with the present example, a plurality of guide parts 193 are provided on the radially outward side of the trunk part 191. This can more surely control the tilt of the trunk part 191, which can allow the damping member 190 to smoothen expanding or contracting of the metal bellows 130.

EXAMPLE 2

Figure 6:
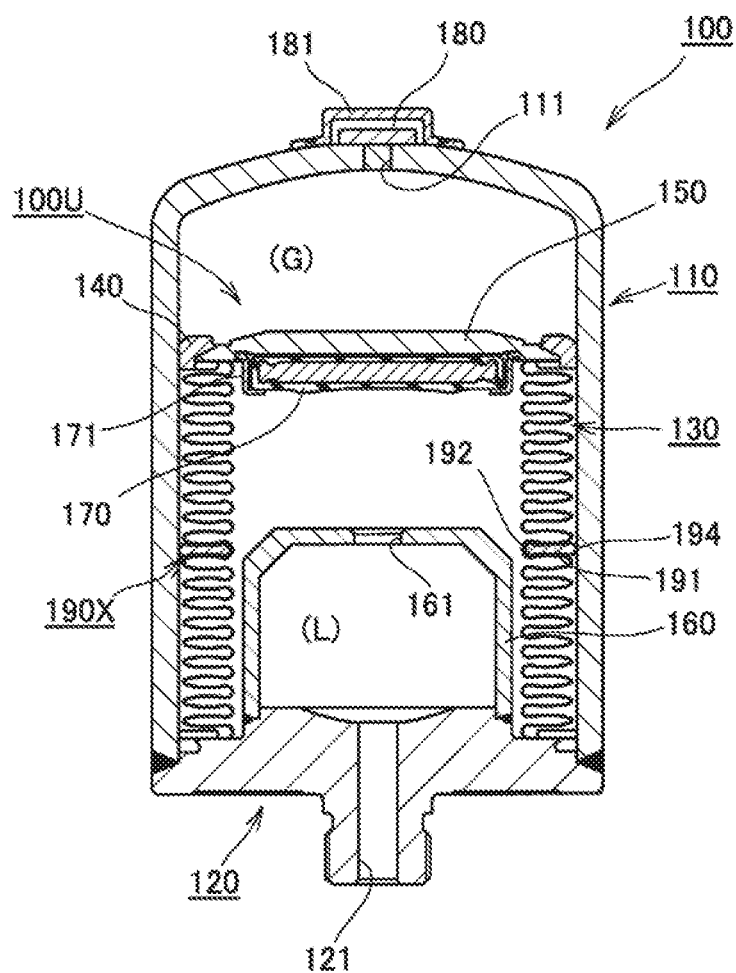
FIG. 6 is a schematic cross sectional view of an accumulator in accordance with Example 2 of the present disclosure.

FIG. 6 shows Example 2 of the present disclosure. The present example shows a configuration of the case where the structure of the damping member is different from that in Example 1. Other configurations and actions are the same as those in Example 1. For this reason, the same constituent portions are given the same reference numerals and signs, and will not be described.

FIG. 6 is a schematic cross sectional view of an accumulator in accordance with Example 2 of the present disclosure, and shows a metal bellows being expanded. A damping member 190X in accordance with the present example has, as with the damping member 190 in Example 1, a trunk part 191 and a fitted part 192. However, the damping member 190X in accordance with the present example does not have a guide part 193 as distinct from the damping member 190 in Example 1. In the damping member 190X in accordance with the present example, only the outer circumferential surface 194 on the radially outward side of the trunk part 191 slides with respect to the inner circumferential surface of the pressure vessel 110. Other configurations than that of the damping member 190X are the same as those in Example 1, and hence will not be described. The damping member 190X having a more simple structure as in the present example may be desirably adopted so long as the metal bellows 130 are smoothly expanded or contracted even when the guide part 193 is not provided according to the sizes of the accumulator 100 and the metal bellows 130, and use environment. Also in the present example, the same effects as those in the case of Example 1 can be obtained.

EXAMPLE 3

Figure 7:
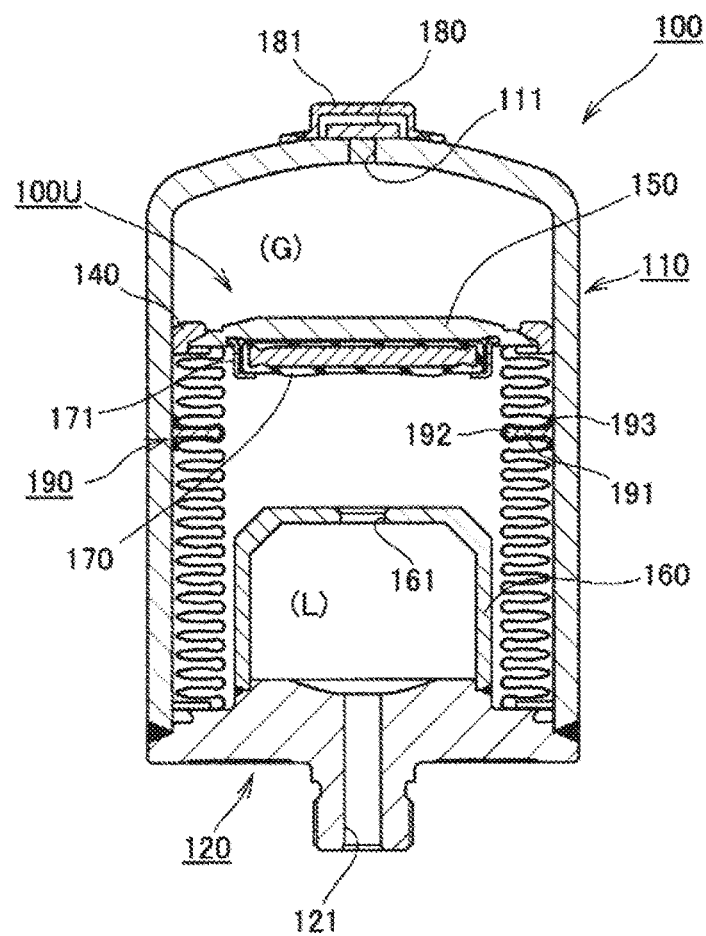
FIG. 7 is a schematic cross sectional view of an accumulator in accordance with Example 3 of the present disclosure.

FIG. 7 shows Example 3 of the present disclosure. In the present example, a configuration of the case where the mounting position of the damping member is different from that in Example 1. Other configurations and actions are the same as those in Example 1. For this reason, the same constituent portions are given the same reference numerals and signs, and will not be described.

FIG. 7 is a schematic cross sectional view of an accumulator in accordance with Example 3 of the present disclosure, and shows a metal bellows being expanded. Example 1 has shown the configuration in which the damping member 190 is provided at the central position in the axial direction of the metal bellows 130. However, the damping member 190 is effectively provided at a position most largely oscillating in the direction perpendicular to the axial direction of the metal bellows 130. The thus largely oscillating position varies according to the use environment, or the like, and is not limited to the central position in the axial direction of the metal bellows 130. In the present example, the damping member 190 is provided at a position closer to the bellows cap 150 side than to the central position in the axial direction of the metal bellows 130. Other configurations than the mounting position of the damping member 190 are the same as those in Example 1, and hence will not be described. Also in the present example, the same effects as those in Example 1 can be obtained. Further, also in the present example, the damping member 190X shown in Example 2 can be adopted.

EXAMPLE 4

Figure 8:
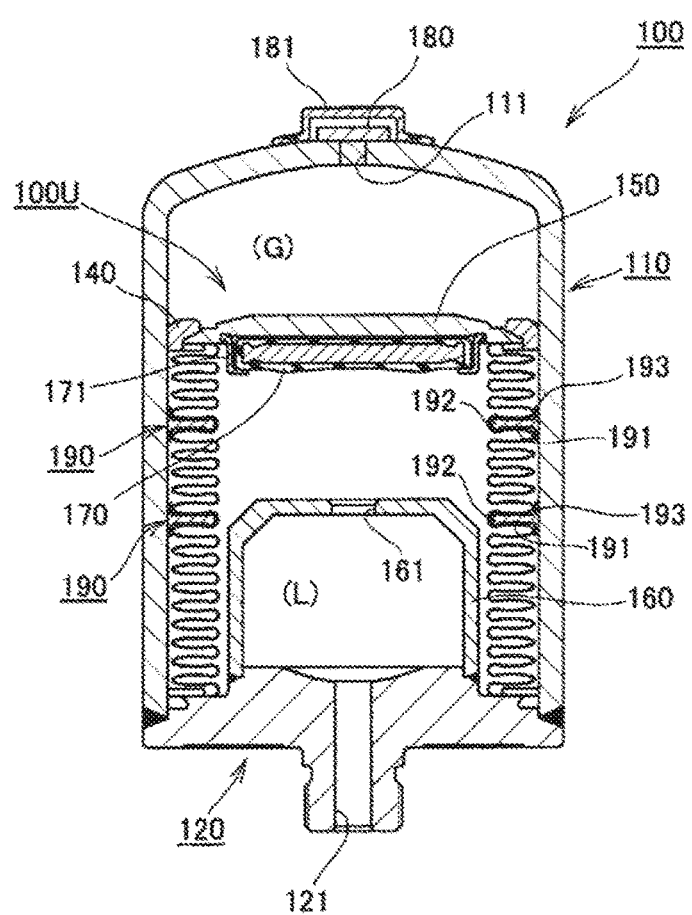
FIG. 8 is a schematic cross sectional view of an accumulator in accordance with Example 4 of the present disclosure.

FIG. 8 shows Example 4 of the present disclosure. The present example shows a configuration in the case where the damping members are mounted at two sites. Other configurations and actions are the same as those in Example 1. For this reason, the same constituent potions are given the same reference numerals and signs, and will not be described.

FIG. 8 is a schematic cross sectional view of an accumulator in accordance with Example 4 of the present disclosure, and shows a metal bellows being expanded. Example 1 has shown the configuration in which the damping member 190 is provided at only the central position in the axial direction of the metal bellows 130. However, only by providing the damping member 190 at one site, it may be not possible to sufficiently prevent the metal bellows 130 from colliding with the inner circumferential surface of the pressure vessel 110, or it may be not possible to sufficiently reduce the oscillation of the metal bellows 130. Under such circumstances, in the present example, the damping members 190 are provided at two sites of the metal bellows 130. The configurations are the same as those in Example 1, except that the damping members 190 are provided at a plurality of sites. For this reason, a description thereon is omitted. Also in the present example, the same effects as those in the case of Example 1 can be obtained. Further, also in the present example, the damping member 190X shown in Example 2 can be adopted. Incidentally, it is naturally understood that the damping members 190 may be provided at three or more sites.

EXAMPLE 5

Figure 9:
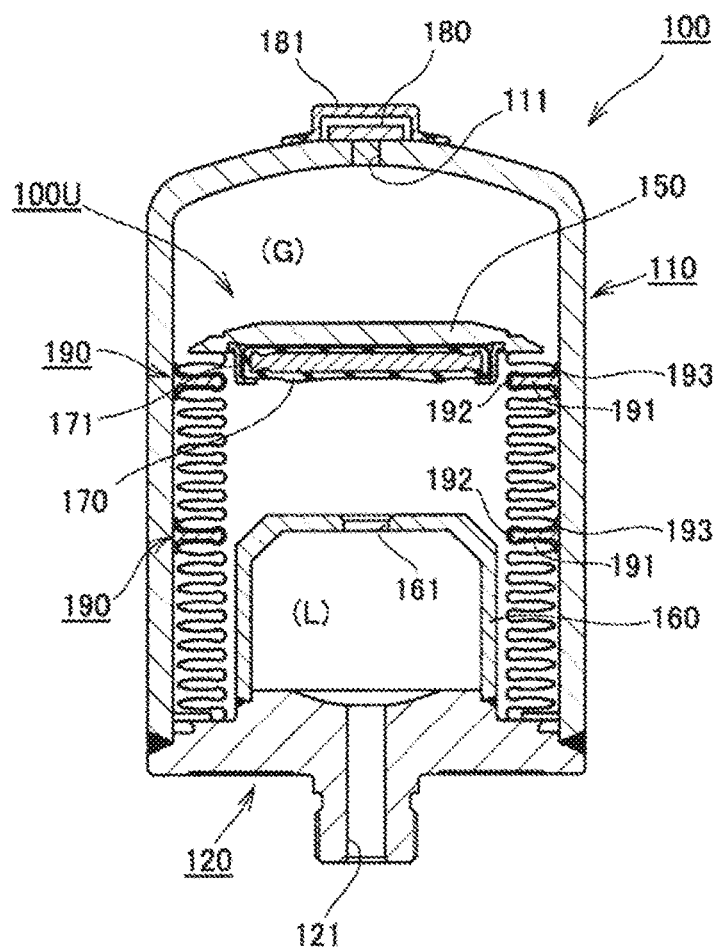
FIG. 9 is a schematic cross sectional view of an accumulator in accordance with Example 5 of the present disclosure.

FIG. 9 shows Example 5 of the present disclosure. The present example shows a configuration in which the damping members are mounted at two sites, and further, the slide ring shown in Example 1 is not used. Other configurations and actions are the same as those in Example 1. For this reason, the same constituent portions are given the same reference numerals and signs, and will not be described.

FIG. 9 is a schematic cross sectional view of an accumulator in accordance with Example 5 of the present disclosure, and shows a metal bellows being expanded. In the present example, as with the case of Example 4, the damping members 190 are provided at two sites of the metal bellows 130. Herein, the damping members 190 exert the same function as that of the slide ring 140 as described in Example 1. Under such circumstances, in the present example, the configuration is adopted in which the damping member 190 is provided in the vicinity of the bellows cap 150 in the metal bellows 130, and thereby the slide ring 140 is not used. The configurations are the same as those in Example 1, except that the damping members 190 are provided at a plurality of sites, and that the slide ring 140 is not used. For this reason, a description thereon is omitted. Also in the present example, the same effects as those in the case of Example 1 can be obtained. Further, also in the present example, the damping member 190X shown in Example 2 can be adopted. Incidentally, it is naturally understood that the damping members 190 may be provided at one site, or three or more sites.

EXAMPLE 6

Figure 10:
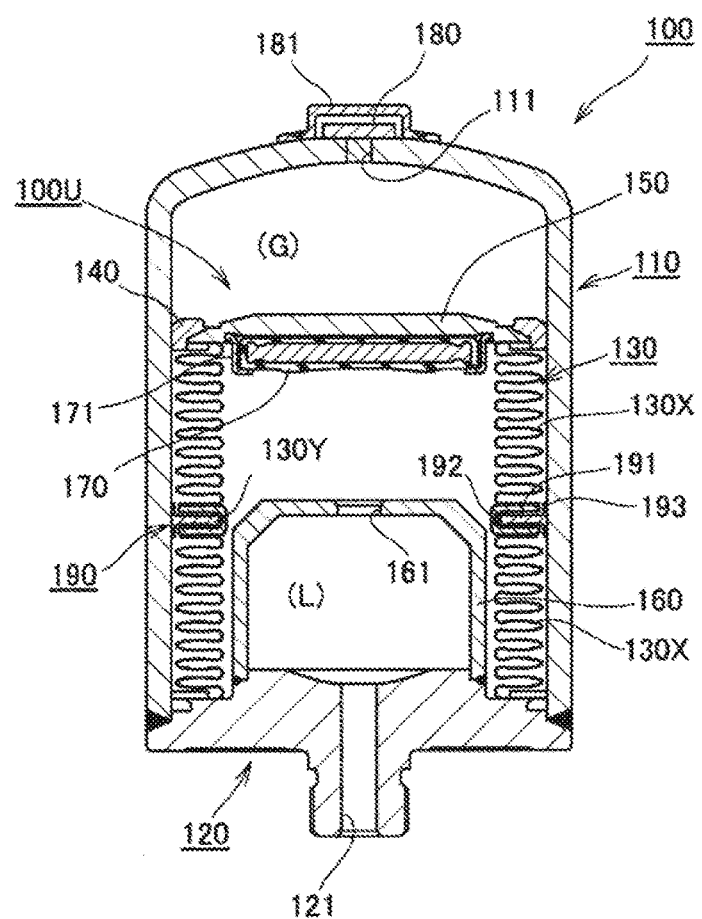
FIG. 10 is a schematic cross sectional view of an accumulator in accordance with Example 6 of the present disclosure.
Figure 11:
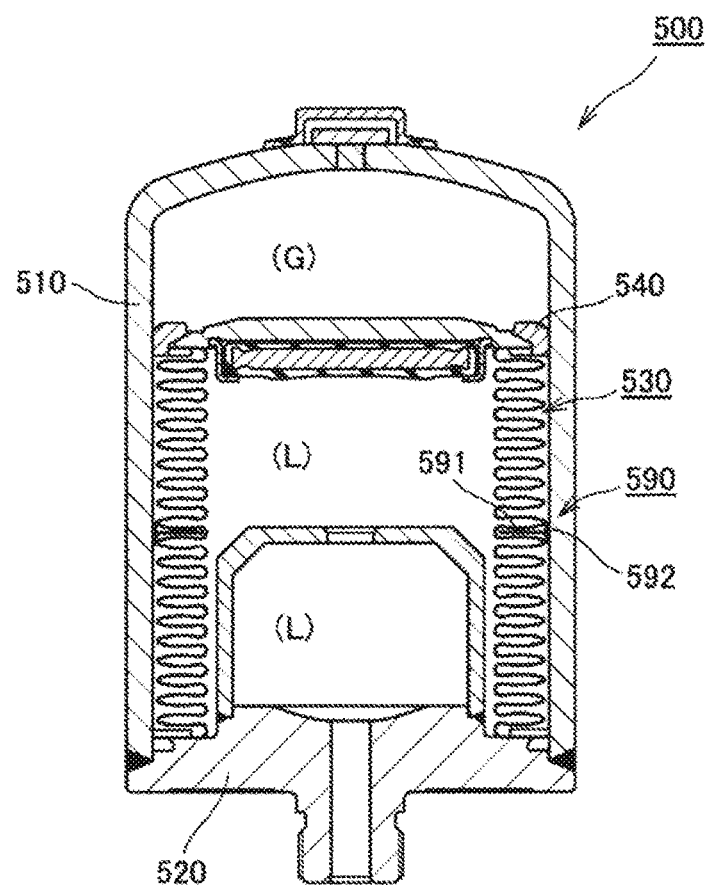
FIG. 11 is a schematic cross sectional view of an accumulator in accordance with a conventional example.

FIG. 10 shows Example 6 of the present disclosure. Example 1 has shown the case where the metal bellows includes a single component. However, the present example shows the case where the metal bellows includes a plurality of components. Other configurations and actions are the same as those in Example 1. For this reason, the same constituent portions are given the same reference numerals and signs, and will not be described.

FIG. 10 is a schematic cross sectional view of an accumulator in accordance with Example 6 of the present disclosure, and shows a metal bellows being expanded. When the metal bellows 130 is long in the axial direction, it may be difficult that the metal bellows 130 is formed of a single component in terms of forming, dimensional precision, or the like. Alternatively, it may also be difficult that the valley part 131b in accordance with the shape or the dimensions of the damping member 190 is provided at the metal bellows 130 formed of a single component in order to mount the damping member 190. Under such circumstances, in the metal bellows 130 in accordance with the present example, a configuration is adopted in which a valley part forming member 130Y only for mounting the damping member 190 is provided between a pair of metal bellows main bodies 130X. Other configurations than that of the metal bellows are the same as those in Example 1, and hence will not be described. Also in the present example, the same effects as those in Example 1 can be obtained. Further, also in the present example, the damping member 190X shown in Example 2 can be adopted. Incidentally, a configuration can also be adopted in which three or more metal bellows main bodies 130X are used, and two or more valley part forming members 130Y are used, so that the damping members 190 are mounted at a plurality of sites. In this case, the configuration not using the slide ring as in the case of Example 5 can also be adopted.

(Others)

The respective examples have shown the case where a formed bellows is adopted as the metal bellows 130. However, the metal bellows for use in the accumulator of the present disclosure is not limited to a formed bellows. For example, a welded bellows obtained by welding a plurality of thin sheet annular members made of a metal can also be adopted.

Further, in the respective examples, a description has been given by taking as an example the outer gas type accumulator configured so that the outside of the metal bellows 130 serves as the gas chamber (G). However, the present disclosure is not limited to the outer gas type accumulator, and is also applicable to an inner gas type accumulator configured so that the inside of the metal bellows serves as the gas chamber. Incidentally, the inner gas type accumulator is disclosed in FIG. 9 of PTL 1.

REFERENCE SIGNS LIST

100 Accumulator
100U Partition unit
110 Pressure vessel
111 Through hole
120 Port forming member
121 Port
130 Metal bellows
130X Metal bellows main body
130Y Valley part forming member
131a Crest part
131b Valley part
131c Belly part
140 Slide ring
150 Bellows cap
160 Substantially bottomed cylindrical member
161 Through hole
170 Seal member
171 Seal holder
180 Plug
181 Plug guide
190, 190X Damping member
191 Trunk part
192 Fitted part
193 Guide part
194 Outer circumferential surface
C Cut part
S Gap

The invention claimed is:

1. An accumulator, comprising:
a pressure vessel; and
a partition unit provided in the pressure vessel, and partitioning an internal space thereof into a gas chamber containing a gas sealed therein, and a fluid chamber containing a working fluid flowing therein,
the partition unit including a metal bellows to be expanded and contracted according to the pressure in the gas chamber and the pressure in the fluid chamber,
the metal bellows including a plurality of annular crest parts and a plurality of annular valley parts alternately formed therein, a damping member formed slidably at an inner circumferential surface of the pressure vessel and suppressing the oscillation of the metal bellows while keeping a gap between the metal bellows and the inner circumferential surface of the pressure vessel, the damping member being mounted at least one site of the plurality of annular valley parts of the metal bellows, wherein
in the damping member, a radially inward tip is fitted with the valley part, and a radially outward tip is longer than the crest part of the metal bellows radially and outwardly, wherein the damping member includes:
a trunk part extending in the circumferential direction, and
a fitted part provided on the radially inward side of the trunk part, and fitted with the valley part, wherein the damping member is positioned and fixed at the metal bellows so as to form a gap between the metal bellows and the trunk part, regardless of an expanded or contracted state of the metal bellows.

2. An accumulator, comprising:

a pressure vessel; and a partition unit provided in the pressure vessel, and partitioning an internal space thereof into a gas chamber containing a gas sealed therein, and a fluid chamber containing a working fluid flowing therein, the partition unit including a metal bellows to be expanded and contracted according to the pressure in the gas chamber and the pressure in the fluid chamber, the metal bellows including a plurality of annular crest parts and a plurality of annular valley parts alternately formed therein, a damping member formed slidably at an inner circumferential surface of the pressure vessel and suppressing the oscillation of the metal bellows while keeping a gap between the metal bellows and the inner circumferential surface of the pressure vessel, the damping member being mounted at at least one site of the plurality of annular valley parts of the metal bellows, wherein in the damping member, a radially inward tip is fitted with the valley part, and a radially outward tip is longer than the crest part of the metal bellows radially and outwardly;

wherein the damping member includes:
  a trunk part extending in the circumferential direction, and
  a fitted part provided on the radially inward side of the trunk part, and fitted with the valley part, wherein
the damping member is positioned and fixed at the metal bellows so as to form a pap between the metal bellows and the trunk part, regardless of an expanded or contracted state of the metal bellows;
  a plurality of guide parts provided spaced apart from each another in the circumferential direction on the radially outward side of the trunk part, a width of each guide part in the expansion and contraction direction of the metal bellows being wider than a width of the trunk part in the direction, and each guide part guiding movement of the trunk part.

3. The accumulator according to claim 2, wherein a thickness of the guide part is set at a thickness such that the guide part does not contact with the tip of the crest part of the metal bellows, regardless of the expanded or contracted state of the metal bellows.

* * * * *